March 31, 1942.    C. A. OTTO    2,278,016
REGULATING APPARATUS
Filed July 31, 1940
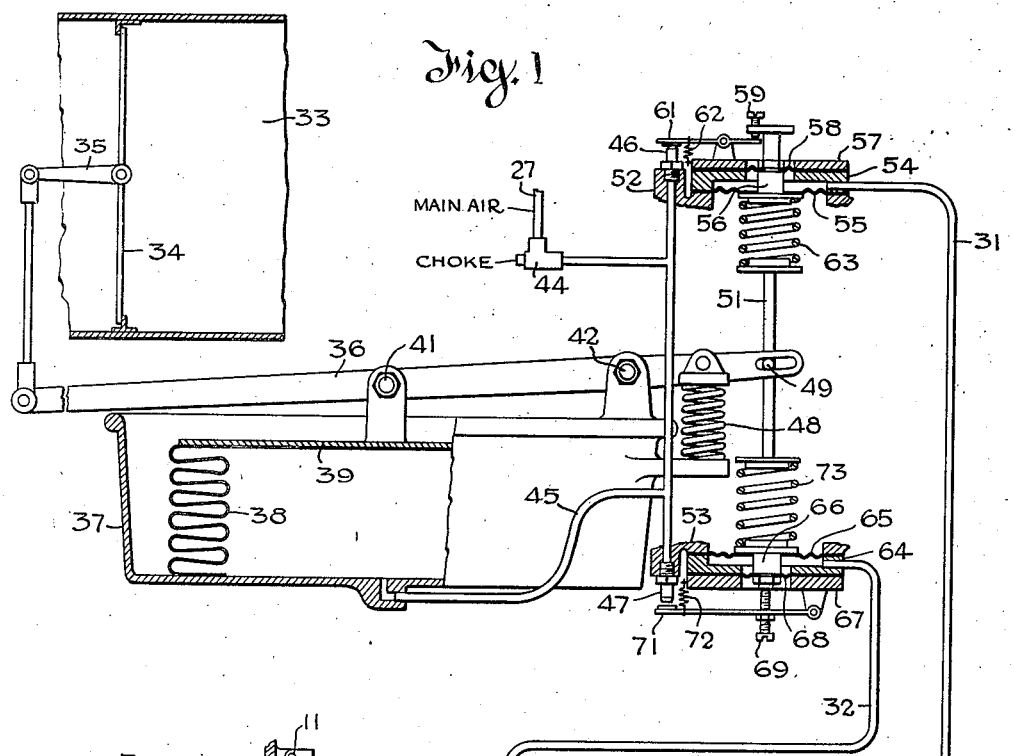
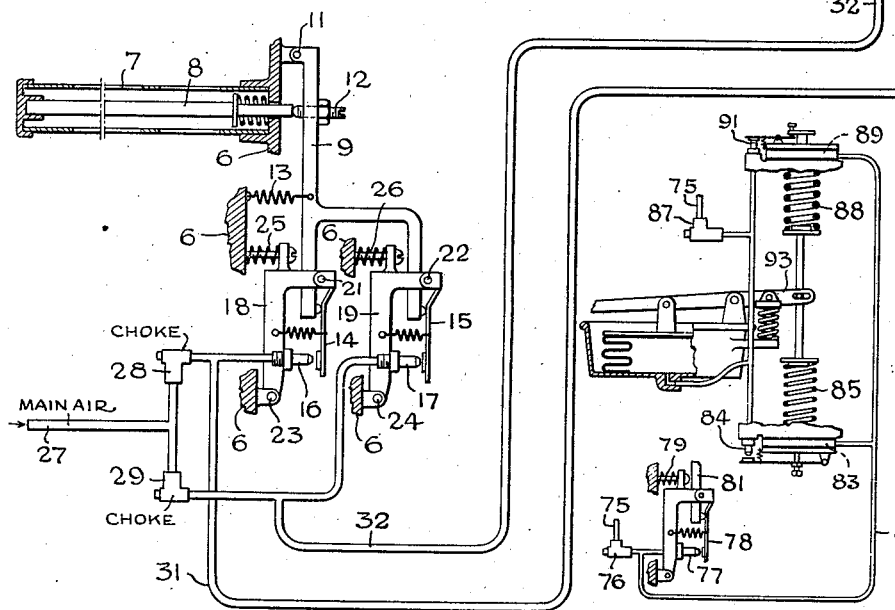
Inventor
Carl A. Otto
By Dodge [signature]
Attorneys Patented Mar. 31, 1942

2,278,016

UNITED STATES PATENT OFFICE 2,278,016

REGULATING APPARATUS

Carl A. Otto, Milwaukee, Wis., assignor to Johnson Service Company, Milwaukee, Wis., a corporation of Wisconsin Application July 31, 1940, Serial No. 348,843

13 Claims. (Cl. 236—49)

This invention relates to devices for regulating temperature, humidity, and the like.

In this art it is sometimes necessary to adjust a device, such as a damper, from one limiting position progressively to another limiting position in response to a progressive change of a quantity such as temperature, and then to adjust the device progressively in the reverse direction in response to continued change of the quantity in the same direction.

As an example, consider a fresh air damper supplying a ventilating system which heats in winter and cools in summer. The following cycle is sometimes desirable and is discussed merely as typical, the temperature being outdoor temperature: below 55° the damper is closed or at any rate in the nearest position to closed which is permitted; from 55° to 65° the damper opens progressively to wide open position, which then persists from 65° to 75°, but from 75° to 85° the damper progressively returns to its initial closed or substantially closed position and remains there at all temperatures above 85°.

Two means for securing this control using a single thermostat are illustrated in the accompanying drawing, in which:

Figure 1 is a diagram, partly sectional, of the essential component of a system employing a multiple unit thermostat; and Fig. 2 is a partial diagram of a modified system in which the controlling thermostat has but a single unit, and a graduated spring arrangement provides for differential ranges of control.

Assuming the temperature cycle above mentioned as typical, the parts are shown in Fig. 1 in the position assumed when temperature is below 55°. The cross-hatched fragments indicated by the reference numerals 6 represent portions of a unitary base broken away to avoid obscuring the drawing. The thermostatic element comprises the tube 7 composed of a thermally expansible material which reacts through a relatively inexpansible thrust rod 8 upon a lever 9 which is pivoted at 11 on a portion of the base 6. The tube 7 is fixed at one end in the base and is closed at its other end, the closed end reacting against the rod 8. Adjustable thrust screw 12 transmits the motion of the rod 8 to the lever 9.

The lever 9 is drawn inward by a tension spring 13 and is forked at its lower end so that it may operate two distinct lids or valves 14 and 15 which control outflow through corresponding leak ports 16 and 17. Each leak port is mounted on an individual frame 18 or 19 as the case may be, and each lid is pivoted to this frame at 21 or 22 respectively. Tension springs, clearly shown in the drawing, are provided to draw the lids toward their respective leak ports. The frames 18 and 19 are pivoted upon the base 6 at 23 and 24 respectively, and adjusting screws with thrust springs are provided as indicated at 25 and 26. Thus the screw 12 permits adjustment of the control point of the instrument, affecting both leak valves in the same degree, whereas adjustments 25 and 26 permit adjustment of each leak port mechanism individually with respect to the lever 9.

Air is supplied at suitable pressure, say 15 lbs., through the line 27 and its flow to the leak ports 16 and 17 is controlled by adjustable chokes 28 and 29 which are adjusted to flow capacity less than the capacity of the corresponding leak ports 16 or 17 when fully open. The choke or needle valve 28 supplies a branch line 31, which is vented at a variable rate by the leak port 16, while choke or needle valve 29 supplies a branch line 32, which is variably vented by the leak port 17. No relays are shown but their use is optional and common in conjunction with the leak port thermostat so that their inclusion is merely a matter of choice. They are omitted to avoid complicating the drawing.

Assuming a supply pressure of 15 lbs. and observing that, since the tube 7 expands on rise of temperature, the leak ports will be throttled in response to rise of temperature, the operation of the thermostat can be explained. Below 55° both leak ports 16 and 17 are wide open so that the branch lines 31 and 32 are at, or substantially at, atmospheric pressure. As temperature rises from 55° to 65°, the lid 15 progressively throttles port 17 and closes it at 65°, with the result that within this temperature range pressure in line 32 rises progressively from atmospheric to 15 lbs. gauge. Leak port 16 remains wide open, however, until a temperature of 75° is reached, but at that temperature the lid 14 commences to throttle the leak port 16, the throttling effect increasing with temperature until the leak port 16 is completely closed at 85°. Thus the pressure in the branch line 31 starts to rise from atmospheric at 75° and attains supply line pressure, or 15 lbs., at 85° and remains at 15 lbs. at all temperatures above 85°.

The parts so far described comprise a well known two point thermostat for which there are many substitutes. A fresh air duct is indicated at 33 and is controlled by a damper 34 which is shown in closed position. An arm 35 is connected by a link, clearly shown in the drawing, with the actuating lever 36 of the damper motor whose housing appears at 37. Housing 37 contains a metal bellows 38 which is closed at its upper end by a thrust plate 39. This thrust plate is pivoted at 41 to the lever 36, which in turn is fulcrumed on the housing 37 at 42.

Main air supplied by another portion of the line 27 is delivered under control of the adjustable choke 44 through line 45 to the space within the bellows 38. Line 45, and hence the bellows motor 38, is also connected with two leak ports 46 and 47. Lever 36 is biased in a damper closing direction by the coil compression spring 48 and an extension of the lever 36 to the right of the fulcrum 42 has a pin and slot connection 49 with a diaphragm-loading thrust rod 51. In the commercial construction the rod 51 is guided for vertical movement, but to simplify the drawing the guides have been omitted.

Fixed in relation to the housing 37 are supporting members 52 and 53 which carry the leak ports 46 and 47 respectively, and which also sustain diaphragm chambers for operating leak valves controlling the ports 46 and 47. The sustaining structure has been omitted to simplify the drawing.

The mechanism supported by the part 52 comprises an annular chamber forming member 54, against the lower face of which a flexible diaphragm 55 is clamped at its periphery and sealed. A central hub or stem 56 extends through and is sealed to the center of the diaphragm 55 and projects upward through a central aperture in a cap 57. Connected to the hub 56 and retained by the cap 57 is a second and much smaller diaphragm 58 whose function is simply to form a seal and avoid the use of a packing gland. Above the cap 57 the hub 56 carries an adjustable thrust screw 59 which reacts on one end of a lid or valve 61 which is pivotally supported between its ends and controls the leak port 46. The lid 61 is drawn in a leak port closing direction by the tension spring 62. The line 31 leads to the chamber between the diaphragms 55 and 58 so that on rising pressure in branch line 31 the hub 56 will be urged downward, that is in a direction to open the lid 61.

To load the diaphragm 55 in a leak port closing direction a coil compression spring 63 is mounted between the hub 56 and the upper end of the rod 51 so that as the damper 34 moves in a closing direction the stress in the loading spring 63 will be increased. This variable loading in response to the motion of the damper gives the desired graduated action of the damper in response to the graduation of pressure in the line 31, as will be apparent from a consideration of the drawing.

The mechanism carried by the support 53 is similar to that just described but operates in a reverse sense. It comprises a chamber forming annular element 64 which clamps the periphery of the main diaphragm 65. This diaphragm has a central hub 66 which is connected to the center of a small diaphragm 68 clamped by the cover ring 67. The hub reacts through an adjustable thrust screw 69 to force lid 71 in an opening direction with reference to the leak port 47. The lid is hinged at its end and is urged in a direction to close the leak port by the tension spring 72. A coil compression spring 73 is mounted between the hub 66 and the lower end of the loading rod 51 to provide the desired graduating reaction.

With both lines 31 and 32 at atmospheric pressure, which is the condition below 55°, hub 56 will be forced upward by the spring 63 so that leak port 46 is closed, while hub 66 will be forced downward by the spring 73 so that leak port 47 is open. Hence the damper is closed. As pressure starts to rise in the branch line 32, as it does at 55°, the development of pressure beneath diaphragm 65 will impart a closing tendency as to lid 71 and the pressure will build up within the bellows 38, producing a balancing action through the increased stress of spring 73. The parts are so arranged that when the pressure in the line 32 reaches 15 lbs. the lever 36 will have swung clockwise until the damper 34 is wide open.

From 65° to 75° the line 32 remains at 15 lbs. while the line 31 remains at atmospheric pressure. Hence both leak ports 46 and 47 are closed and the damper remains wide open.

At 75° however, the pressure in the line 31 starts to rise, with the result that diaphragm 55 exerts a downward pressure, tending to open the leak port 46. With increasing branch line pressure the action of the damper is progressive because of the loading effect of spring 63 as the damper 34 moves in a closing direction. The parts are so arranged that when pressure in line 31 attains 15 lbs., the damper will again be fully closed.

Thus the damper is closed when both the branch lines 31 and 32 are at atmospheric pressure and when both are at the full supply pressure. The rise of pressure in the branch line 32 through the lower temperature range produces opening movement of the damper and, similarly, rise in pressure in the branch line 31 through the upper range of temperature causes retrogressive movement of the damper from open to closed position.

It is preferable to use a two point thermostat and two distinct branch lines because this permits individual adjustments to be made and secures the utmost precision of operation which is attainable. On the other hand, it should be borne in mind that the control is exercised by development of pressure in two phases, first beneath the diaphragm 65, and second above the diaphragm 55, and the graduating action of the damper is dependent on the loading effect of the springs 63 and 73. Obviously other arrangements making use of this general principle may be worked out. One such arrangement is shown in Fig. 2.

Figure 2 illustrates an alternative embodiment in which a single controlling leak port functions to control two diaphragm operating leak ports arranged as in Fig. 1. Here main line pressure supplied through pipe 75 and choke 76 leads to leak port 77 having a lid 78 subject to control by a thermostat of conventional single range type and which may otherwise have the form shown in Fig. 1. The lid 78 is biased to closed position by a spring and may be opened upon falling temperature by lever 81 connected to the thermostat. Adjustment of the lid 78 may be performed by the adjusting screw associated with thrust spring 79.

Line 82, controlled by leak port 77, has two connections, one leading to diaphragm chamber 83 controlling the lid of leak port 84, and another leading to diaphragm chamber 89 controlling the lid of leak port 91. The arrangement here illustrated is similar to that described in connection with Fig. 1 except that the two ranges of movement of the bellows motor are obtained by the use of two springs exerting different opposing forces. As shown, spring 85, which opposes movement of the diaphragm in chamber 83, is weaker than spring 88 associated with diaphragm chamber 89. Consequently, when pressure rises in line 82, the first effect, upon overcoming the bias of spring 85, will be to close leak port 84, thereby causing pressure rise in the bellows 92 to open the damper. Since spring 88 is stronger than 85, it holds leak port 91 closed until pressure in diaphragm chamber 89 rises and overpowers the combined effect of springs 85 and 88. When this occurs the leak port 91 will open to close the damper.

The arm 93 connected to the operating bellows is similar to arm 36 described in connection with Fig. 1. The operation of the system of Fig. 2 is similar to that of Fig. 1 except that a single controlling leak port is utilized and the two ranges of damper movement are obtained through the use of the graduated springs 85 and 88. Here, as before, the parts may be so arranged that at temperatures below 55° the damper will remain closed, leak ports 77 and 84 being open and leak port 91 being closed. Between temperatures of 55° and 65° the leak port 77 will be partially closed to build up pressure in diaphragm chamber 83 to close leak port 84 and open the damper. The damper will be held open until a temperature of 75° is obtained, when leak port 77 will be closed and pressure built up in diaphragm chamber 89 sufficiently to start opening leak port 91 to close the damper. When a temperature of 85° is reached, and at all temperatures above 85°, the damper will be closed, leak port 91 remaining open and leak ports 77 and 84 being closed.

The modifications of Fig. 2 offers the advantage of simplifying the leak port controlling structure associated with a thermostat or other controlling instrument, but lacks the advantages of individual adjustment. The arrangement permits selection of control through a 15 lb. range, that is, between atmospheric and 15 lbs. In the example given the diaphragm 83 is operative over a 4 lb. range between 4 and 8 lbs. while diaphragm 89 is operative over a 4 lb. range between 9 and 13 lbs. Obviously other pressure ranges and temperature ranges might be chosen by suitable selection of springs 85 and 88 without departing from the principles herein set forth.

The invention, of which two embodiments have been described, has the advantage of permitting movement of a valve or the like through successive relatively reverse cycles in response to a continuous rise, or a continuous fall, in temperature or other atmospheric condition, while employing an ordinary non-reversible controlling instrument. Such an arrangement is adaptable to many uses without the complication and expense of reversible instruments and without the necessity of changing instrument settings when changing from one cycle of movement to another.

I claim:

1. In a regulating system, valve means for controlling the flow of a medium; a source of pressure fluid; a pressure motor for operating said valve means; means responsive to an atmospheric condition for controlling said pressure motor; and means interposed between said pressure motor and said source and controlled in part by said motor for causing sequential movement of said valve in opposite directions during a continuous atmospheric condition change in one direction.

2. In a regulating system, valve means for controlling the flow of medium; a source of pressure fluid, a pressure motor for operating said valve means; diaphragm operated leak port means pneumatically connected to said source and to said motor and mechanically connected to said motor for controlling said pressure motor, for causing valve movement in one direction or the other; and temperature responsive means for controlling said leak port means to cause successive opening and closing movements of the valve during a continuous temperature change in one direction.

3. In a regulating system, valve means for controlling flow of a heat exchange medium; a source of pressure fluid; a pressure motor for operating said valve means; a plurality of leak port devices mechanically connected with said motor to be affected by motion thereof, and serving to control said pressure motor each through a pressure range different from the other, and each range producing operation of the valve means in a direction opposite to that of the other; and means responsive to changes in an atmospheric condition for controlling said leak port devices.

4. In a regulating system, a source of pressure fluid; a valve for controlling the flow of a medium; a pressure motor for operating said valve; a plurality of leak port devices connected to said motor, one for causing valve movement in a closing direction and another for causing valve movement in an opening direction; loading connections between said motor and leak port devices; and a temperature responsive instrument for causing said leak port devices to function successively during a continuous temperature change in one direction.

5. In a regulating system, a source of pressure fluid having two discharge lines, a temperature responsive instrument for varying the pressure in said lines selectively depending upon the temperature; a diaphragm motor connected to each of said lines; a valve for controlling the flow of a medium; a pressure motor for operating said valve; and a leak port device operatively associated with each of said diaphragm motors, one device being effective to cause said valve to open and the other to cause it to close as pressure is varied in one or the other of said lines under the control of said instrument.

6. In a regulating system, a valve for controlling flow of a medium; a pressure motor for actuating said valve; a source of pressure fluid; a pair of leak port devices interposed between said source and said motor, said devices being so arranged that when either of them is open the valve will be closed and when both of them are closed the valve will be open; loading means for said leak port devices arranged to be actuated by said motor; and a temperature responsive instrument for controlling said leak ports to control said valve.

7. In a regulating system, a valve for controlling flow of a heat exchange medium; a pressure motor for actuating said valve; a source of pressure fluid; a pair of leak port devices interposed between said source and said motor, said devices being so arranged that when either of them is open the valve will be closed and when both of them are closed the valve will be open; a diaphragm motor operatively associated with each of said leak ports to control the same; and a temperature responsive instrument for causing pressure fluid to be supplied to one or both of said diaphragm motors to position said valve in accordance with temperature conditions.

8. In a regulating system, a valve for controlling flow of a heat exchange medium; a pressure motor for actuating said valve; a source of pressure fluid; a pair of leak port devices interposed between said source and said motor, said devices being so arranged that when either of them is open the valve will be closed and when both of them are closed the valve will be open; a diaphragm motor associated with each of said leak ports to control the same; individual springs associated with each of said diaphragm motors to oppose leak port controlling movements of the motors, said springs opposing different forces to their respective motors; and a temperature responsive instrument for controlling the supply of pressure fluid to both of said diaphragm motors to position said valve in accordance with temperature conditions.

9. In a regulating system, valve means for controlling flow of a medium; a source of pressure fluid; a pressure motor for operating said valve means; means responsive to variations in a physical quantity for controlling said pressure motor; and means interposed between said pressure motor and said source and controlled in part by said motor for causing sequential movement of said valve in opposite directions during a continuous change in said physical quantity in one direction.

10. In a regulating system, valve means for controlling the flow of a medium; a source of pressure fluid; a pressure motor for operating said valve means; diaphragm operated leak port means connected to said source and to said motor for controlling said pressure motor, for causing valve movement in one direction or the other; loading connections between said motor and said leak port means; and means responsive to variations in a physical quantity for controlling said leak port means to cause successive opening and closing movements of the valve during a continuous change in said physical quantity in one direction.

11. In a regulating system, a source of pressure fluid; a valve for controlling the flow of a medium; a pressure motor for operating said valve; a plurality of leak port devices connected to said motor, one for causing valve movement in a closing direction and another for causing valve movement in an opening direction; connections whereby motion of the motor variably loads said leak port devices; and an instrument responsive to changes in a physical quantity for causing said leak port devices to function successively during a continuous change in said physical quantity in one direction.

12. In a regulating system, a source of pressure fluid having two discharge lines; an instrument responsive to changes in a variable physical quantity for varying the pressure in said lines selectively depending upon the value of said quantity; a diaphragm motor connected to each of said lines; a valve for controlling the flow of a medium; a pressure motor for operating said valve; and a leak port device operatively associated with each of said diaphragm motors, one device being effective to cause said valve to open and the other to cause it to close as pressure is varied in one or the other of said lines under the control of said instrument.

13. In a regulating system, a valve for controlling flow of a medium; a pressure motor for actuating said valve; a source of pressure fluid; a pair of leak port devices interposed between said source and said motor, said devices being so arranged that when either of them is open the valve will be closed and when both of them are closed the valve will be open; variable loading means for said leak port devices connected to be actuated by said motor; and means responsive to changes in a variable physical quantity for controlling said leak ports to control said valve.

CARL A. OTTO.